Dec. 23, 1958 M. E. JONES ET AL 2,866,140
GROWN JUNCTION TRANSISTORS
Filed Jan. 11, 1957
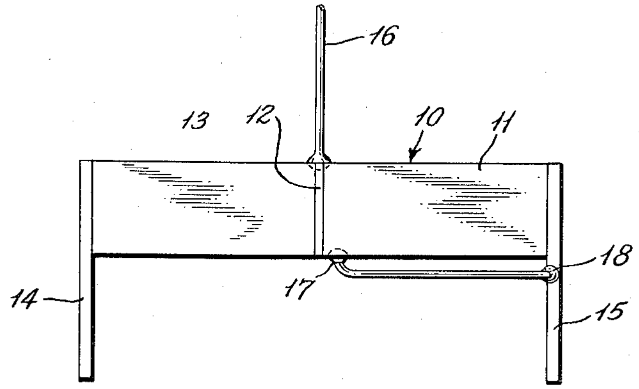
INVENTORS
MORTON E. JONES,
EDMOND D. JACKSON
and RICHARD F. STEWART
BY
Stevens, Davis, Miller & Mosher
ATTORNEYS United States Patent Office 2,866,140

Patented Dec. 23, 1958

2,866,140

GROWN JUNCTION TRANSISTORS

Morton Edward Jones, Edmond Donald Jackson, and Richard Frank Stewart, Dallas, Tex., assignors to Texas Instruments Incorporated, Dallas, Tex., a corporation of Delaware Application January 11, 1957, Serial No. 633,586

9 Claims. (Cl. 317—235)

This invention relates to grown junction transistors, and particularly to an arrangement for lowering the bulk collector resistance of grown junction silicon transistors.

The art of making grown junction transistors, although a relatively new art, has already adopted certain practices as more or less standard, and while these practices result in the production of transistors that are generally desirable in their characteristics, some things do result from the accepted methods of manufacturing transistors that are not entirely desirable, at least in transistors to be used for some particular purposes This invention is directed toward the improvement, in one particular respect, of transistors that are, except for the practices of this invention, prepared by practices that are now more or less generally accepted.

Grown junction transistors, of both germanium and silicon, are usually prepared by growing a semiconductor crystal from a molten mass of germanium or silicon. The molten mass of semiconductor material is usually doped rather lightly to produce a crystal of either an n-type or a p-type conductivity, about half of the crystal is grown from this molten mass, a sufficient amount of another impurity is added to the molten mass to change the type of conductivity of the crystal being grown, a very thin layer of crystal is grown, and then a considerable amount of the first-mentioned or still a different impurity is added to reconvert the type of crystal being grown and the remaining crystal is grown so as to have the same type of conductivity as the first part of the crystal. The resultant crystal is then cut into a large number of small bars, each of which has end portions of the same type of conductivity separated by a very thin layer of material of the opposite type of conductivity. The end portions of the bars differ, however, in that one end portion is very lightly doped and the other end portion is quite heavily doped. As a result of this, the specific resistivity of the end portions of these bars is quite different.

Connections having been made to each of the end portions of the bars and also to the thin separating layer, the end portion having the greater amount of doping, and hence the lower resistivity, is ordinarily used as the emitter of the transistor, the thin separating layer as the base, and the portion having the higher resistivity as the collector.

The size of these transistor bars is not always the same, but in general they are about .005 to 0.40 inch in cross section and about .15 to .35 inch in length. The thin dividing layer usually extends transversely about midway of the length of the bar. In mounting these bars for use as transistors it is customary to attach an electrical connection, which also serves as a supporting member, to each end of the bar and attach a third electrical connection, which usually has very little to do with supporting the bar, to the separating layer. When such a transistor is used in circuit embodiments in which a relatively high voltage can be applied to the collector, the specific resistivity of the collector portion of the transistor bar is not of too great importance, and a fairly high collector resistance can be tolerated. However, in certain uses, such as low-voltage switching arrangements, it is highly undesirable to have a transistor with a high collector resistance, that is high resistance to current flowing in the forward direction.

There are, of course, various ways in which the specific resistivity of the material comprising the collector section of the transistor may be lowered, and there are various ways of lowering the resistance between the base contact and the collector contact without changing the specific resistivity of collector material, but these methods of solving this problem are less satisfactory in a practical way than the quite simple solution afforded by the present invention. Any effort to change the specific resistivity of the collector section of the bar requires, in the first place, major changes in the procedure for growing the crystal and the addition of doping material to the collector section to reduce its specific resistivity requires that the base section and emitter section be doped even more highly, which tends to interfere with the desired transistor action of the unit as a whole. Any attempt to shorten the collector section of the bar to lower its resistance results in constructional troubles in mounting and supporting the bar in the usual way in the final transistor construction.

According to the present invention, a transistor bar, preferably a silicon transistor bar, although a germanium transistor bar is within the broad scope of this invention, is prepared and mounted in the usual way, so that it is supported at the ends, and a connection is made to the base layer near the center of the bar and the transistor bar has its usual characteristics. The characteristics of the transistor as a whole are then modified by making an ohmic contact to the transistor bar at a point quite close to the base layer and connecting this ohmic contact directly to the collector connection. The result of this arrangement is to materially lower the forward resistance between the base contact and the collector contact without materially lowering the reverse resistance, which is dependent almost entirely upon the action at the interface between the collector and base sections of the bar. This arrangement has the further advantage of leaving untouched the original mechanical construction of the transistor, the chemical composition of the transistor bar, and the heat dissipation ability of the transistor. In fact, the ohmic contact adds somewhat to the ability of the transistor bar to dissipate heat.

The application of the principles of this invention has been illustrated in the drawings by a single figure, which is a side elevational view of the parts of the transistor that are concerned herewith.

In this drawing there is illustrated a transistor bar 10, which is preferably of silicon, doped to produce a collector layer 11, a base layer 12 and an emitter layer 13. The base layer 12 is, of course, much narrower than it is possible to show in a drawing. This transistor bar is preferably of silicon grown in the usual way, and hence having a collector section that is lightly doped and an emitter section that is doped relatively much more heavily. As a result, the resistivity of the collector section is fairly high. For example, in an n-p-n silicon transistor, the collector resistivity is about 1-2 ohm-centimeters as compared with an emitter section resistivity of about .001-.01 ohm-centimeter. The transistor bar 10 is supported by an emitter lead 14 and a collector lead 15, these leads being of heavy enough conductive material to adequately support the bar and being attached to the ends of the bar in such a way that ohmic connections, that is, non-rectifying connections, are formed. A connection 16 is attached to the base layer 12 in the usual way. The construction thus far described is conventional in the present state of the art, and in order to obtain efficient operation out of such a construction, it is usually found desirable to apply a voltage of at least 6 volts to the collector in normal operation.

In low-voltage switching operations, particularly, it is highly desirable to apply a much lower voltage to the collector and still obtain efficient operation. In accordance with this invention, it has been found that this can be accomplished by making an ohmic connection to the collector section of the transistor bar at 17 and carrying this ohmic connection to the collector lead 15 at point 18. This ohmic connection is preferably made quite close to the base layer, for example, 1 to 5 mils removed from it. It has been found that in the case of an n-p-n silicon transistor, the ohmic contact may be made by heating the silicon to a temperature between 450° C. and 700° C. by some means such as an electric furnace and then pressing a gold wire containing about 1 percent of antimony into contact with the transistor bar at the desired point. The heating is continued until the contacting end of the gold-antimony wire softens and alloys itself with the collector section of the bar, whereupon the heating is stopped and the ohmic contact allowed to solidify. Similarly, in making an ohmic connection to the collector section and an n-p-n-germanium transistor, a gold wire containing about 1% antimony may also be used and this wire is brought into contact with the collector section at a point spaced about 1–5 mils from the base layer. Instead of making ohmic connection by heating in a furnace, however, the connection may be made by passing sufficient electrical current through the wire and germanium transistor bar to cause fusion to take place. Usually the source of this current will be connected to the gold wire and to the collector segment of the bar so that it does not have to pass through the junction of the bar. For either the silicon transistor or the germanium transistor the gold wire will thereafter be fastened at its other end to the collector lead at point 18 by any of the usual and well known means such as welding or soldering.

In the case of a p-n-p transistor, it will, of course, be necessary to dope the gold wire with a p-type impurity, for example, gallium. With either type of transistor bar the ohmic contact may be made with other alloys or other conductivity type determining materials than those specifically mentioned. A number of other alloys and pure metals are known that are available to make ohmic contacts with both n- and p-type materials.

As has been stated, the preference, insofar as this invention is concerned, is for silicon transistors and here the principles of this invention show to their greatest advantage. However, the principles may also be applied to the manufacture of germanium transistors and the same advantages, although to a somewhat lesser extent, will accrue.

While we have disclosed the principles of this invention as applied to transistors made in the heretofore known ways, and it will usually be found desirable to so apply the principles of this invention, it is possible to modify known transistors somewhat in applying this invention, without departing from the spirit of this invention. For example, the collector lead 15 may be fastened to the end of the transistor bar 10 without forming an electrical contact therebetween, since the electrical contact is formed by the connection at 17, in any event, and the direct connection between the collector lead 15 and the end of the transistor bar is therefore not as necessary as heretofore. Other variations in the manner of application of the principles of this invention will be apparent to those skilled in the art and are considered to be within the scope of this invention as defined by the appended claims.

What is claimed is:

1. A grown junction transistor that comprises an elongated transistor bar including an emitter section, a base section and a collect or section, the emitter section and the collector section each being relatively long and the base section being relatively very short, the emitter section being relatively highly doped and of relatively low resistivity and the collector section being relatively lightly doped and of relatively high resistivity, an emitter lead connected to the emitter end of the transistor bar to furnish an electrical connection and a mechanical support therefor, a base lead connected to the base section of the transistor bar to furnish an electrical connection therefor, a collector connection attached to the collector end of the transistor bar so as to furnish at least a mechanical support therefor, and an ohmic connection between the collector lead and the collector section of the transistor bar at a point closely adjacent to the base layer of the transistor bar.

2. A grown junction transistor that comprises an elongated silicon transistor bar including an emitter section, a base section and a collector section, the emitter section and the collector section each being relatively long and the base section being relatively very short, the emitter section being relatively highly doped and of relatively low resistivity and the collector section being relatively lightly doped and of relatively high resistivity, an emitter lead connected to the emitter end of the transistor bar to furnish an electrical connection and a mechanical support therefor, a base lead connected to the base section of the transistor bar to furnish an electrical connection therefor, a collector connection attached to the collector end of the transistor bar so as to furnish at least a mechanical support therefor, and an ohmic connection between the collector lead and the collector section of the transistor bar at a point closely adjacent to the base layer of the transistor bar.

3. A grown junction transistor that comprises an elongated transistor bar including an emitter section, a base section and a collector section, the emitter section and the collector section each being relatively long and the base section being relatively very short, the emitter section being relatively highly doped and of relatively low resistivity and the collector section being relatively lightly doped and of relatively high resistivity, an emitter lead connected to the emitter end of the transistor bar to furnish an electrical connection and a mechanical support therefor, a base lead connected to the base section of the transistor bar to furnish an electrical connection therefor, a collector connection attached to the collector end of the transistor bar so as to furnish an electrical connection and a mechanical support therefor, and an ohmic connection between the collector lead and the collector section of the transistor bar at a point closely adjacent to the base layer of the transistor bar.

4. A grown junction transistor that comprises an elongated n-p-n transistor bar including an emitter section, a base section and a collector section, the emitter section and the collector section each being relatively long and the base section being relatively very short, the emitter section being relatively highly doped and of relatively low resistivity and the collector section being relatively lightly doped and of relatively high resistivity, an emitter lead connected to the emitter end of the transistor bar to furnish an electrical connection and a mechanical support therefor, a base lead connected to the base section of the transistor bar to furnish an electrical connection therefor, a collector connection attached to the collector end of the transistor bar so as to furnish at least a mechanical support therefor, and an ohmic connection between the collector lead and the collector section of the transistor bar at a point closely adjacent to the base layer of the transistor bar.

5. A grown junction transistor that comprises an elongated n-p-n silicon transistor bar including an emitter section, a base section and a collector section, the emitter section and the collector section each being relatively long and the base section being relatively very short, the emitter section being relatively highly doped and of relatively low resistivity and the collector section being relatively lightly doped and of relatively high resistivity, an emitter lead connected to the emitter end of the transistor bar to furnish an electrical connection and a mechanical support therefor, a base lead connected to the base section of the transistor bar to furnish an electrical connection therefor, a collector connection attached to the collector end of the transistor bar so as to furnish at least a mechanical support therefor, and an ohmic connection between the collector lead and the collector section of the transistor bar at a point closely adjacent to the base layer of the transistor bar.

6. A grown junction transistor that comprises an elongated n-p-n silicon transistor bar including an emitter section, a base section and a collector section, the emitter section and the collector section each being relatively long and the base section being relatively very short, the emitter section being relatively highly doped and of relatively low resistivity and the collector section being relatively lightly doped and of relatively high resistivity, an emitter lead connected to the emitter end of the transistor bar to furnish an electrical connection and a mechanical support therefor, a base lead connected to the base section of the transistor bar to furnish an electrical connection therefor, a collector connection attached to the collector end of the transistor bar so as to furnish an electrical connection and a mechanical support therefor, and an ohmic connection between the collector lead and the collector section of the transistor bar at a point closely adjacent to the base layer of the transistor bar.

7. A grown junction transistor that comprises an elongated germanium transistor bar including an emitter section, a base section and a collector section, the emitter section and the collector section each being relatively long and the base section being relatively very short, the emitter section being relatively highly doped and of relatively low resistivity and the collector section being relatively lightly doped and of relatively high resistivity, an emitter lead connected to the emitter end of the transistor bar to furnish an electrical connection and a mechanical support therefor, a base lead connected to the base section of the transistor bar to furnish an electrical connection therefor, a collector connection attached to the collector end of the transistor bar so as to furnish at least a mechanical support therefor, and an ohmic connection between the collector lead and the collector section of the transistor bar at a point closely adjacent to the base layer of the transistor bar.

8. A grown junction transistor that comprises an elongated n-p-n germanium transistor bar including an emitter section, a base section and a collector section, the emitter section and the collector section each being relatively long and the base section being relatively very short, the emitter section being relatively highly doped and of relatively low resistivity and the collector section being relatively lightly doped and of relatively high resistivity, an emitter lead connected to the emitter end of the transistor bar to furnish an electrical connection and a mechanical support therefor, a base lead connected to the base section of the transistor bar to furnish an electrical connection therefor, a collector connection attached to the collector end of the transistor bar so as to furnish at least a mechanical support therefor, and an ohmic connection between the collector lead and the collector section of the transistor bar at a point closely adjacent to the base layer of the transistor bar.

9. A grown junction transistor that comprises an elongated n-p-n germanium transistor bar including an emitter section, a base section and a collector section, the emitter section and the collector section each being relatively long and the base section being relatively very short, the emitter section being relatively highly doped and of relatively low resistivity and the collector section being relatively lightly doped and of relatively high resistivity, an emitter lead connected to the emitter end of the transistor bar to furnish an electrical connection and a mechanical support therefor, a base lead connected to the base section of the transistor bar to furnish an electrical connection therefor, a collector connection attached to the collector end of the transistor bar so as to furnish an electrical connection and a mechanical support therefor, and an ohmic connection between the collector lead and the collector section of the transistor bar at a point closely adjacent to the base layer of the transistor bar.

References Cited in the file of this patent

UNITED STATES PATENTS

| | | |
|---|---|---|
| 2,654,059 | Shockley | Sept. 29, 1953 |
| 2,728,034 | Kurshan | Dec. 20, 1955 |
| 2,792,540 | Pfann | May 14, 1957 |
| 2,795,742 | Pfann | June 11, 1957 |